Dec. 14, 1965     E. J. HARRIS     3,222,716
TIRE CURING PRESS AND UNLOADING APPARATUS THEREFOR
Original Filed Jan. 22, 1959     6 Sheets-Sheet 5

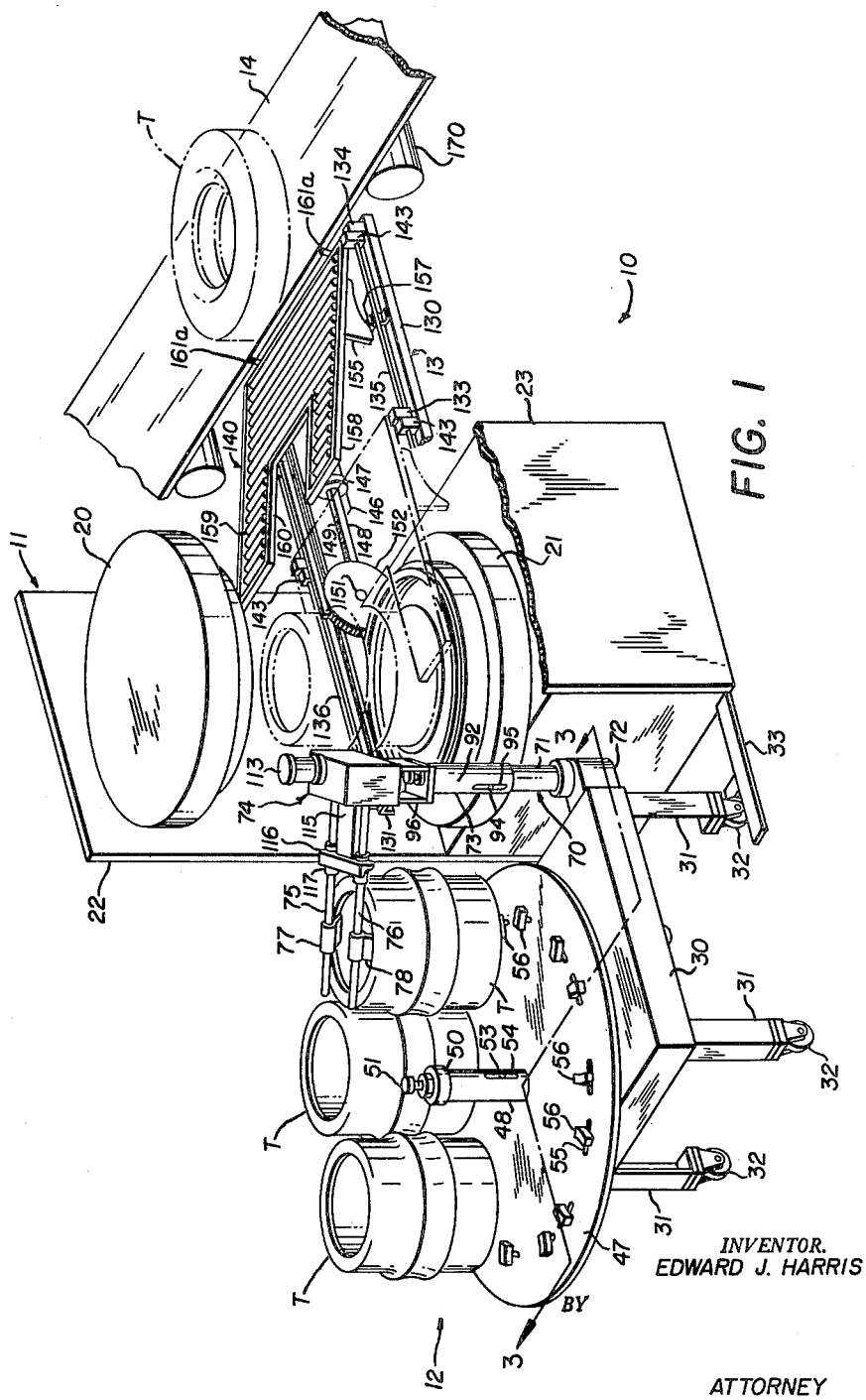

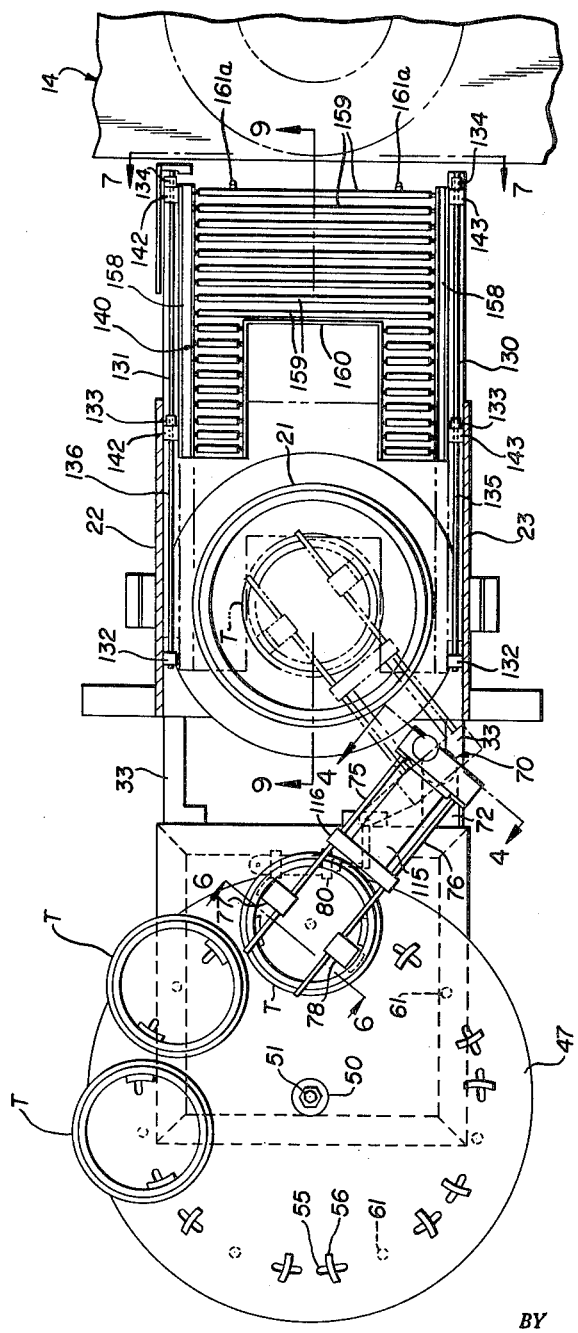

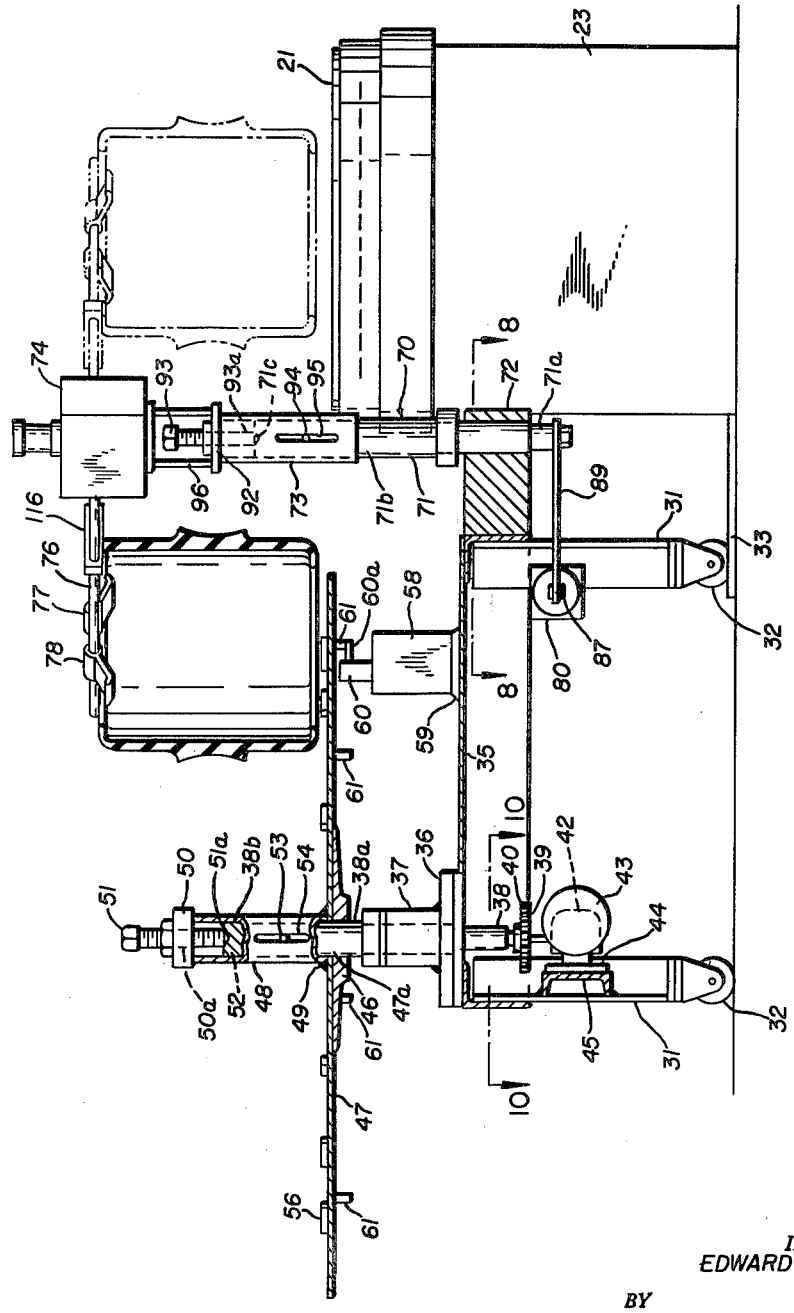

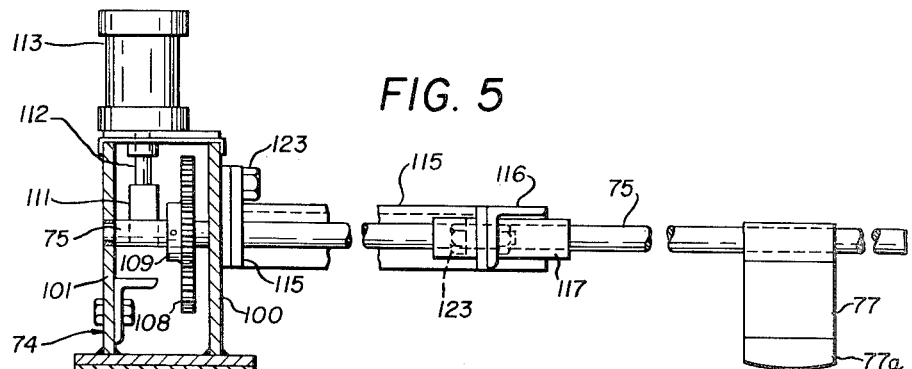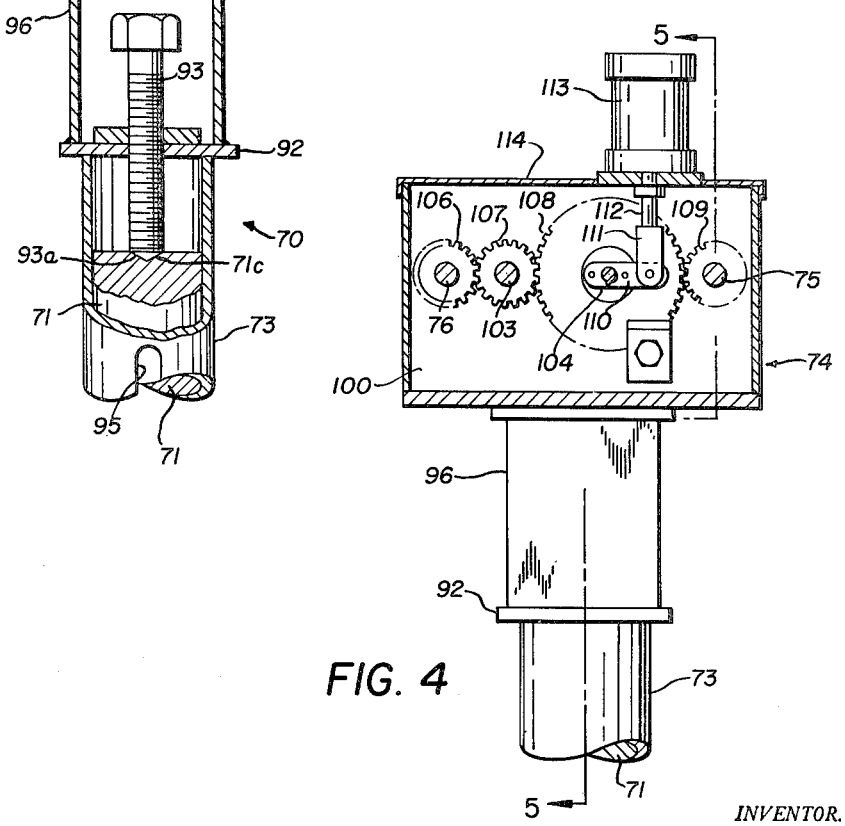

INVENTOR.
EDWARD J. HARRIS
BY

ATTORNEY

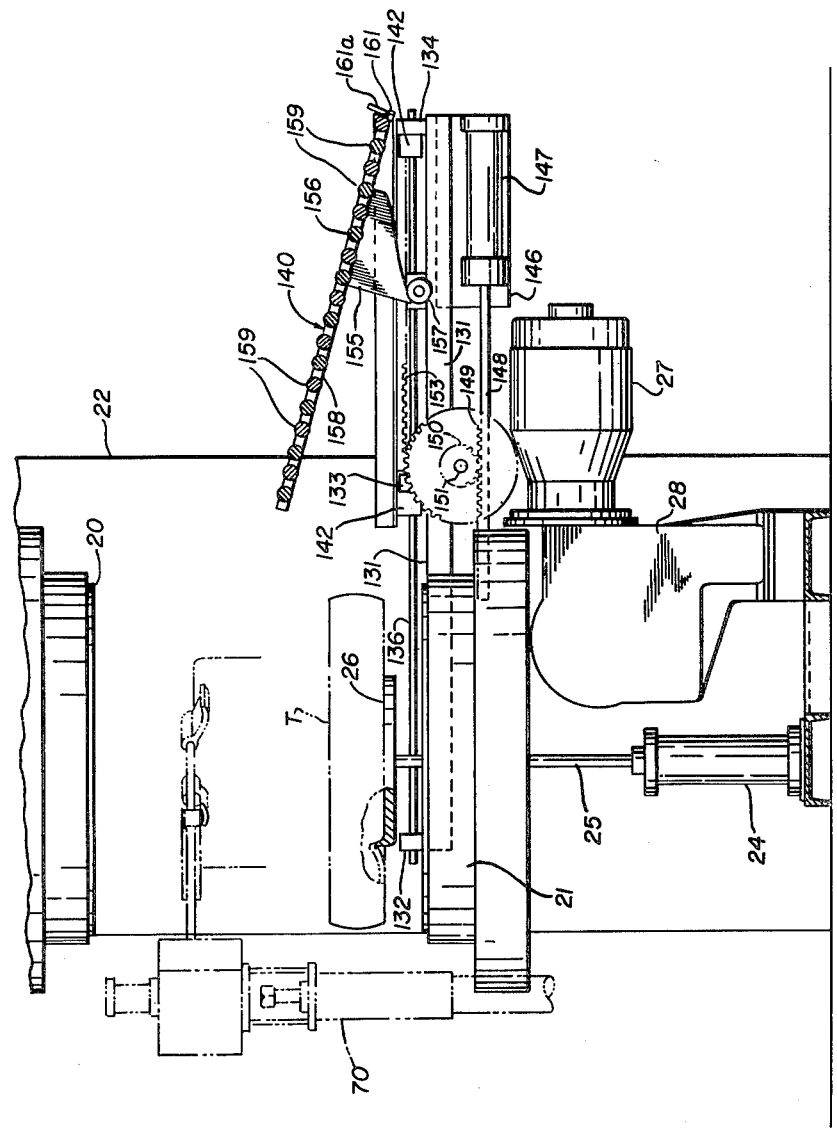

United States Patent Office 3,222,716
Patented Dec. 14, 1965

3,222,716
TIRE CURING PRESS AND UNLOADING
APPARATUS THEREFOR
Edward J. Harris, 1733 Tanglewood Drive, Akron, Ohio
Application Oct. 7, 1964, Ser. No. 402,277, which is a division of application Ser. No. 788,456, Jan. 22, 1959. Divided and this application Jan. 25, 1965, Ser. No. 427,793
13 Claims. (Cl. 18—2)

My application, Serial No. 788,456 (now abandoned) was filed January 22, 1959. Application Serial No. 402,277 filed October 7, 1964 is a division of that application, and this application is a division of Serial No. 402,277.

The invention relates to improvements in unloading devices in tire-curing apparatus.

In the known prior art, it has long been well established that pneumatic tires are "flat built" in a generally cylindrical shape and then are shaped and cured to the desired toroidal configuration by the use of tire curing presses that have been designed for this purpose.

In the past, the prior art has taught many advances in connection with apparatus of this type, with modern day equipment utilizing automatic insertion and withdrawal of the pneumatic former that aids in shaping the carcass to the desired configuration during curing thereof.

While the art has advanced technically with respect to the actual curing operation, little advance, if any, has been made with respect to the manner in which the uncured tire carcasses are loaded into the curing press. Similarly, little or no improvement has been made in the manner in which the cured tire is removed from the press after vulcanization thereof.

Thus, while the curing and shaping cycles have been fully automated as a result of advances in the prior art, there has been no attempt at elimination of the human operation that is still required to load and unload the press after each curing operation. In the normal instance, elevated conveyor systems pass in front of the press with uncured flat built tires provided thereon, while a second elevated conveyor is usually provided near the front of the press so that the operator can manually remove the cured tire from the press and place the same on the second conveyor to cause transportation thereof to another part of the manufacturing facilities.

It has been discovered that the aforementioned hand unloading operations can be eliminated by providing automatic unloading devices that are associated with the vulcanizing press itself.

With regard to the basic structure of the unloading mechanism, it has been found that by employing the same in connection with a vulcanizing press that has ejecting means, that a roller mechanism may be horizontally advanced to a position beneath the raised tire, followed by release of the bead ejector means so that the tire becomes suspended on the roller mechanism. At this time, horizontal withdrawal of the roller means from between the mold sections of the press, followed by automatic tipping of the same, may cause the cured tire to be automatically delivered to an adjacent conveyor belt so that the same may automatically be removed from the press and delivered to another part of the plant.

Of particular importance with regard to the structures employed is the fact that the same can be used interchangeably with a wide variety of types of vulcanizing presses. With the use of the unloading device, it is only necessary that the press employed have an ejection means so that the tire may be raised so as to be axially spaced from the lower mold section. In this fashion, the unloading roller mechanism can be slid under the same to cause removal thereof as will be described fully in the following paragraphs.

Accordingly, it becomes the principal object of this invention to provide an improved type of tire-curing apparatus, including a vulcanizing press, and an unloading device for the same.

Production of a vulcanizing press having the above desirable features accordingly becomes the principal object of this invention, with other objects thereof becoming more apparent upon a reading of the following brief specification, considered and interpreted in the light of the accompanying drawings.

Of the drawings:

FIGURE 1 is a perspective view illustrating the improved vulcanizing press and showing the improved unloading means associated therewith, with the vulcanizing press being shown semi-schematically for the purpose of clarity;

FIGURE 2 is a plan view of the improved vulcanizing press, unloading mechanism, with the positions of certain components of the loading mechanism being shown in full and chain dotted line positions;

FIGURE 3 is a vertical elevation taken on the lines 3—3 of FIGURE 1 and showing internal construction of the loading mechanism;

FIGURE 4 is a view taken on the lines 4—4 of FIGURE 2;

FIGURE 5 is a view taken on the lines 5—5 of FIGURE 4;

Figure 6:
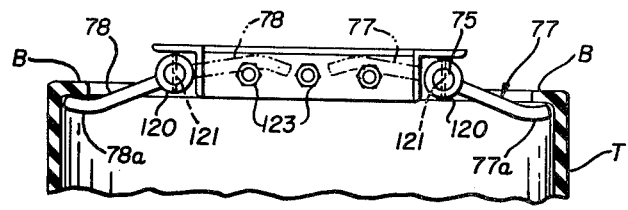
Figure 7:
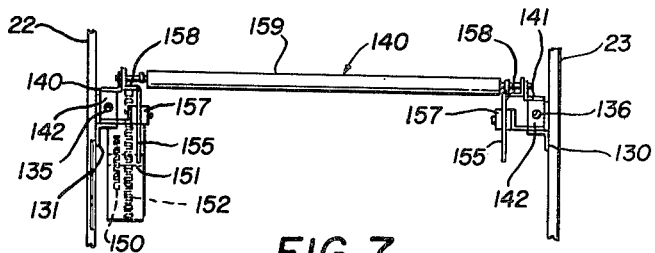
Figure 11:
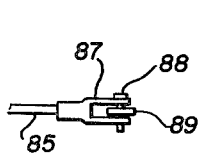
Figure 8:
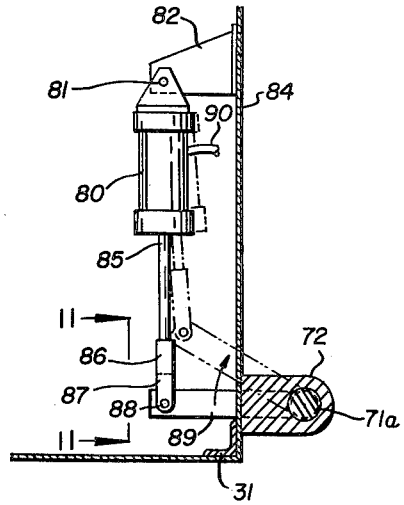

FIGURES 6 and 7 are sectional views taken on the lines 6—6 and 7—7 of FIGURE 2;

FIGURE 8 is a horizontal section taken on the lines 8—8 of FIGURE 3;

FIGURE 9 is a vertical section taken on the lines 9—9 of FIGURE 2; and

Figure 10:
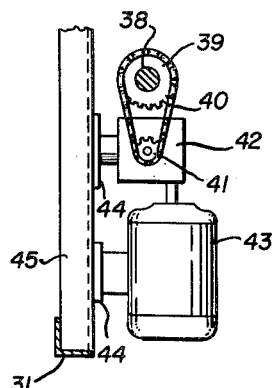

FIGURE 10 is a horizontal section taken on the lines 10—10 of FIGURE 3.

Referring now to the drawings and in particular to FIGURE 1 thereof, the improved tire curing mechanism, generally designated by the numeral 10, includes a vulcanizing press 11, a loading mechanism 12 and an unloading mechanism 13; the arrangement being such that uncured tires T, T received on the loading means 12 are delivered to the curing press 11 for shaping and curing, with the unloading means 13 serving to remove the finished, toroidal-shaped tire T from the press 11 and deliver the same to a conveyor 14 for removal from the area.

For the purposes of convenience, the individual components above described will be separately discussed, as will the operation of the entire overall mechanism 10.

*The vulcanizing press 11*

It has been previously indicated that the loading means 12 and unloading means 13 may be associated with any one of several known types of prior art devices that feature relatively movable mold sections equipped with tire ejection means to separate the finished tire from the lower mold section after opening of the press.

In this regard, the drawings illustrated herein do not illustrate means for moving the upper mold section 20 relatively of the fixed lower mold section 21. However, it is to be understood that several prior art devices could be employed for effectuating this movement and attention is directed to applicant's copending application Serial No. 765,386, filed October 6, 1958, now Patent No. 3,052,920, for a detailed disclosure of a representative actuating mechanism for effectuating such movement between the mold sections 20 and 21.

The vulcanizing press 10 shown herein does, however, include opposed side plates 22 and 23, with lower mold section 21 being fixed between the side plates 22 and 23, as clearly shown in FIGURES 1, 3 and 9 of the drawings.

In addition to the aforementioned component parts, the press 11 further includes a piston 24 that projects vertically of the press base and which includes an extensible piston rod 25 that is secured at its free end to an ejector ring 26, with this ejector ring 26 being designed to engage the lower bead section of the tire T, as clearly shown in FIGURE 9 of the drawings. In this manner, the ejector ring 26 will move relatively of the lower mold section 21, with the result that the toroidal shaped tire T can be elevated above the mold section to effectuate removal thereof from press 11 by the unloading means 13, as will presently be described.

A motor 27 and gearing 28 are shown in FIGURE 9, with it being understood that these components operate a shaft, which in turn operates an eccentrically located link arm to raise and lower the upper mold section 20 in the manner set forth in applicant's copending application Serial No. 765,386, filed October 6, 1958.

*The loading mechanism 12*

The structure of the loading mechanism 12 is best shown in FIGURES 1 through 6 and 8 through 11 of the drawings, and if reference will first be had to FIGURE 1 of the drawings, it will be seen that the same, in essence, comprises a table 30 having depending legs 31, 31 that serve to elevate the table 30 to the proper height above the floor, with casters 32, 32 being provided on the respective legs 31, 31 for the purpose of making the entire loading unit 12 portable to permit moving of the same for the purpose of changing the mold. In this regard, the base portion of the press 11 is shown provided with projecting guide plates 33, 33 that serve to properly locate the casters 32, 32 so that the table 30 is positioned in proper relationship with respect to the press 11, as shown in FIGURE 1.

Referring next to FIGURES 3 and 10, it will be seen that the top surface 35 of table 30 is provided with a reinforced area 36 to which may be secured a vertically extending bushing 37, with a shaft 38 being rotatably journaled in bushing 37. A sprocket 39, fixed to the lower end of shaft 38, receives a chain 40 that also plays about a sprocket 41 that extends from a gear reduction box 42, with gear reduction box 42 being driven by motor 43, as clearly shown in FIGURE 10 of the drawings. In this regard, both the gear reduction box 42 and the motor 43 are secured, in known fashion, by plates 44, 44, to a reinforcing plate 45 that is, in turn, fixed between the depending legs 31, 31 of table 30.

By the above structure, it is believed apparent that the operation of motor 43 will result in rotation of shaft 38 about its axis within the bushing 37.

Referring again to FIGURE 3, it will be seen that the shaft 38 has an enlarged diameter portion 38a thereof journaled within a boss 46 that is secured to the underside of a circular plate 47. The enlarged portion 38a of shaft 38 is also shown journaled in a tubular extension 48 that is secured to table 47 in concentricity with aperture 47a thereof, as by weld 49. A top cap 50 on extension 48, is provided with a threaded bore 50a within which an adjustment screw 51 may be received, with the end 51a of the adjustment screw 51 bearing against a notch 52 that is provided in the end 38b of shaft 38. In this fashion, the entire sub-assembly of boss 46, plate 47, tubular extension 48 and screw 51 is telescoped as a unit over the projecting shaft 38a, with adjustment of the vertical height of this sub-assembly above table 35, for example, being effectuated by rotation of adjusting screw 51.

For the purpose of imparting rotational movement to the table 47 upon rotation of shaft 38, the shaft 38 further includes at least one removable pin 53 that is received within an elongate slot 54 provided in tubular extension 48. In this fashion, the pin 53 may ride in slot 54 during adjustment of vertical height as by rotation of adjustment screw 51, while during rotation of shaft 38, equivalent rotation will be imparated to plate 47 by virtue of the interlock between pin 53 and slot 54.

Referring next to FIGURE 1, it will be seen that the table 47 is further provided with a series of arcuately extending slots 55, 55, with a guide lug 56 of arcuate contour being received in each slot. As shown in FIGURE 1, the lugs 56, 56 are arranged in opposed pairs so as to engage the bead areas of a flat built tire T positioned on table 47, with adjustment for varying bead diameter being achieved by the adjustability of lugs 56, 56 within the slots 55, 55.

In addition to the aforementioned component parts, it will be further noted that an angle frame 58 is also welded, as at 59, to table top 35 so as to dispose the arm 60a of a microswitch 60 in the path of movement of index stops 61, 61 that are provided on the underside of table 47. In this manner, the table 47, upon rotation of a certain predetermined amount, will have an index tab 61 strike the arm 60a of microswitch 60, so as to cause de-energization of motor 43, with the result that rotation of the table top 47 will be terminated.

For the purpose of removing tire carcasses from table 47 for delivery to press 10, a tire delivering apparatus, generally designated by the numeral 70, is shown provided on one corner of the table 30.

Accordingly, and referring first to FIGURE 1, it will be seen that, in essence, the tire delivering apparatus 70 includes a shaft 71 that is rotatably journaled in a support bearing 72 so as to rotatably drive a vertically adjustable sleeve 73 with sleeve 73 having fixed thereto a gear housing 74 that operates to rotate arms 75 and 76 relatively thereof so that wing members 77 and 78 will be rotated around the axis of the arms 75 and 76 to cause lifting of the tire off of the table to the full line position shown in FIGURE 3 of the drawings.

While the structure 70 operates generally in the manner indicated above, if reference will first be had to FIGURES 3 and 8, it will be seen that a piston 80 is rotatably pinned, as at 81 to a flange 82 that is, in turn, secured to the side frame member 84 of the table 30. The piston rod 85 is shown secured to a link arm 86 that has its yoked end 87 (see FIGURE 11) pinned through pin 88 to a crank arm 89 that is, in turn, secured around the lowermost reduced portion 71a of shaft 71, with shaft 71 being rotatably journaled in support 72, as is clearly shown in the drawings. In this fashion, upon operation of piston or air cylinder 80, as by applying retracting pressure to piston 80 through line 90 from a source (not shown) the link arm 89 will pivot in the direction of the arrow in FIGURE 8 to cause equivalent rotation of shaft 71. In the position shown in full lines in FIGURE 8, the shaft 71 is located so that mechanism 70 is disposed as shown in FIGURE 1, with it being apparent that retraction of the piston from the full line position of FIGURE 8 would result in rotation of the shaft 71 to cause rotation of the tire delivering apparatus 70 to a position between molds 20 and 21. It is, of course, apparent that other linkages could be employed in this regard to achieve equivalent movement.

As in the case of previously described shaft 38, the upper portion 71b of shaft 71 is telescopically received within tubular member 73 that has a top plate 92 that threadingly receives an adjusting screw 93, with lower end 93a of the adjusting screw 93 bearing against a notch 71c that is provided in shaft 71. A removable or retractable pin 94 is carried by the shaft 71 and is received within slot 95 for the purpose of imparting rotational movement to the tubular member 73 upon rotation of shaft 71 while permitting limited axial movement between members 71 and 73.

As has previously been indicated, a gear housing 74 is fixed to extension 73 through frame 96, as shown in FIGURE 5, and if reference will be had to FIGURES 4, 5 and 6 of the drawings, the detailed mechanism within the enclosure 74 will now be described.

Accordingly and first referring to FIGURE 5, it will first be seen that the enclosure 74 includes opposed reinforced walls 100 and 101 between which may be journaled a plurality of shafts 76, 103, 104 and 75, with these shafts respectively having keyed or pinned thereto, gears 106, 107, 108 and 109 (see FIGURE 4). The shaft 104 further has keyed thereto a link arm 110 that has its outboard end pinned to a yoke 111 that is attached to the piston rod 112 of an air cylinder 113 that is secured to the top surface 114 of the housing 74.

For the purpose of insuring true rotation of the projecting shafts 75 and 76, the wall 100 has secured thereto projecting angle bars 115, 115, with these angle bars, in turn, being connected to a transversely extending angle bar 116, as shown best in FIGURE 5 of the drawings. Guide bushings 117, 117 are secured to the transverse frame 116 and the shafts 75 and 76 are journaled therethrough, with the result that the rotating shafts 75 and 76 are, in fact, supported at a point remote from the housing 74.

The outline contour of the wing members 77 and 78 is best shown in FIGURE 6 of the drawings and as illustrated therein, the wing members are identical in contour but are opposite hand when keyed to shafts 75 and 76. Accordingly, each wing member includes a cylindrical base section 120 that is telescoped around the respective shaft therefor and pinned thereto by pins 121, 121 so that the wing members will rotate in unison with the shafts 76 and 75. Additionally, the outboard ends of each wing member are contoured as at 77a and 78a for the purpose of effectuating a lifting action when positioned under the bead B of the tire T, as shown in FIGURE 6. It is to be understood in this regard that the usual bolts 123, 123 are employed for securing the various previously described members in association with each other as described. Additionally, it is to be noted, as best shown in FIGURES 1 and 5, that the wings 77 and 78 are located inwardly of the outboard ends of the shafts 75 and 76 and, in this manner, when the wings raise the tire T upon rotation of the shafts 76 and 75, the bead will engage the shafts 75 and 76 at four points so as to prevent cocking of the same during the lifting.

*The unloading mechanism 13*

The structure of the unloading mechanism is best shown in FIGURES 1, 2, 7 and 9 of the drawings, and if reference is first had to FIGURE 1, it will be seen that the entire unloading mechanism is movably associated with a pair of opposed support frames 130 and 131 that are attached to the side plates 22 and 23 and which extend transversely thereof and project rearwardly thereof as clearly shown in FIGURE 1 of the drawings. The guide frame or plates 130 and 131 each include support blocks 132, 133 and 134 (see FIGURE 2) within which may be fixed opposed guide rods 135 and 136 respectively.

While the just described members are fixed with respect to the press as has just been described, the unloading frame, generally designated by the numeral 140, is movably associated with the guide rods 135 and 136 and to this end and referring to FIGURE 7, it will be seen that the outer frame work 141 of the frame member 140 is provided with a series of apertured blocks 142 and 143 that respectively surround the guide rods 135 and 136, with two support blocks 142 and 143 being provided on each side of frame 140, as shown best in FIGURE 2 of the drawings. It will be understood that in this fashion the frame 140 can slide between the full and chain dotted line positions of FIGURE 2 by virtue of the just described blocks being slidably journaled on the rods 135 and 136.

For the purpose of providing the just described movement, a frame 146 is shown in FIGURE 9 as depending from the guide frame 131, with an air cylinder 147 being fixed to the just described frame 146. The piston 148 of air cylinder 147 has a gear rack portion 149 that, in turn, meshes with a gear 150 that is carried on a shaft 151 that is journaled about the side plate 22. A larger diameter gear 152 is also keyed to the shaft 151, with this gear meshing with a rack 153 provided on the underside of the side frame 141 (see FIGURE 7). In this manner, upon actuation of the air cylinder, the shaft 151 will rotate to cause rotation of gear 152, which will, in turn, cause horizontal shifting of the frame 140.

For the purpose of effectuating the tipping action shown in FIGURE 9, the inner frames 158, 158 also include cam plates 155, 155, each of which has a cam surface 156 designed to act against rollers 157, 157, as shown in FIGURE 9 To effectuate this pivoting movement, the inner frame work, generally designated by the numeral 158 in FIGURE 7 of the drawings, is pivoted to the outer frame work 141, with the result that when the cam plates 155, 155 strike the rollers 147, the inner frame work will be pivoted to the position shown in FIGURE 9.

In this regard, it is to be, of course, understood that the inner frame work 158 supports a plurality of transversely extending rollers 159, 159, with the unit 140 also being provided with a cut out 160 (see FIGURE 2) for the purpose of clearing the ejector shaft 25 and bead ring 26. At least one microswitch 161 is provided adjacent the rear edge of the frame 160, with the result that when a tire T is rolled across the frame, the microswitch 161 will be energized to recycle the unit 70, as will be described.

In FIGURE 1, a conveyor 14 is shown associated with the rear end of the frame 140. It is to be understood that this conveyor normally runs in the direction indicated by the arrow in FIGURE 1 and is supported by rollers 170, 170.

*Operation of the device*

In use or operation of the improved device, it will first be assumed that the component parts have been positioned as shown in FIGURE 1 of the drawings and that all operating connections between the respective members have been made and that the device is ready for use.

Accordingly and with it being assumed that the press 11 is open as shown in FIGURE 1, the motor 43 will first be energized to cause the table 47 to rotate and position an uncured tire carcass T beneath the arms 75 and 76, with the wings 77 and 78 having been turned in as shown in chain dotted lines in FIGURE 6 to permit clearance of the advancing tire.

During this advance of the tire T by rotation, it is, of course, understood that the advancing pin 61 will strike the solenoid arm 60a to cause de-energization of motor 43.

When the tire T has been positioned beneath the wings 77 and 78, as shown in the drawings, air cylinder 113 may be energized to cause opposite rotation of the shafts 75 and 76, with the result that the wing arms 77 and 78 will rotate around the axis of shafts 75 and 76 to the full line position of FIGURE 6 and cause the tire to be raised off of the table 47.

At this time the air cylinder 80 may be actuated to cause return of the piston 85 from the full line position of FIGURE 8, with this just described operation resulting in a clock-wise rotation of the shaft 71 in FIGURE 1 of the drawings. A similar clock-wise movement of mechanism 70 will occur, with the result that the tire will be swung around the axis of the shaft 71 to a position between the mold sections 20 and 21, with the tire in this position being shown in chain dotted lines in FIGURE 1 of the drawings. When the tire is properly located between the mold sections as just described, the air cylinder 113 may be energized to rotate the shafts 75 and 76, at which time the wing arms will rotate back to the chain dotted line position shown in FIGURE 6 and release the tire, with the tire at this time being seated on the retracted bead ring 26.

When the tire is thus seated, the unit 70 may be swung out of the path of advancement of the mold section 20 by expanding the piston 80 to the position shown in full lines in FIGURE 8 of the drawings. During this return movement of unit 70, a microswitch (not shown) may be contacted to (1) start the motor 43 to advance table 47, and (2) start the closing of press 11, to cause shaping and curing of the positioned tire.

It is to be remembered that during this time the unloading mechanism is in the inactive position shown in full lines in FIGURE 1 of the drawings.

When the curing cycle is complete, the molds may be separated and upon stripping of the tire from the upper mold section 20, the piston 24 may be operated to raise the ejector ring 26 and thus strip the tire T from the lower mold section 21 and elevate the same thereabove, as shown in chain dotted lines in FIGURE 9.

When the tire is in the position shown in FIGURE 9, the piston 148 may be actuated to cause the frame 140 to horizontally move between the separated mold sections. While the frame 140 will be elevated at the arcuate angle shown in FIGURES 1 and 9 during the initial stages of this shifting, it is apparent that as soon as the cam surfaces 156, 156 leave rollers 157, 157 that the frame 140 will be pivoted to a horizontal position so that the same will advance under the elevated tire T, with this condition of the frame 140 being shown in chain dotted lines in FIGURE 1 of the drawings.

During this just described positioning, the cut out portion 160 will surround the shaft 25 and bead ring 26 so that the frame 140 can be completely positioned under the annular tire. When the frame 140 is positioned as just described, the piston 24 can be de-energized to permit lowering of the bead ring 26 through opening 160, which will then cause the tire T to be suspended on the frame 140. With the tire T being suspended on the frame 140, as just described, the piston 147 can be operated in the opposite direction to cause the frame 140 to move from between the mold sections 20 and 21 to a position towards the conveyor 14.

As the frame 140 approaches the conveyor 14, the cam surfaces 156, 156 will strike the rollers 157, 157 and the frame 140 will be pivoted to the inclined position shown in FIGURES 1 and 9 of the drawings.

By virtue of the fact that the frame 140 consists of a plurality of rollers 159, 159, the tire T will then roll across the frame and be delivered onto the conveyor 14. During this discharge of the tire T from frame 140, as just described, the tire T will strike the trip arms 161a of the microswitch 161, with operation of this microswitch causing an energization of the cylinder 113 for repetition of the above described cycle of events.

*Automated operation of the device*

While the device can be operated as just indicated, the preferred embodiment envisions the completely automatic operation of the device, with repetitive cycles occurring.

Because the operation of the loading and unloading mechanism will be timed to the press, it is felt that the best description of this cycle can be made by starting the description at the point following curing of the tire.

Accordingly and after the completion of the curing cycle, the press mechanism will be automatically opened, followed by extending of the bead ejector ring 26.

During the extending of the bead ring 26, a microswitch (not shown) will be contacted to cause the piston 147 to be energized so as to move the unloading frame 140 beneath the tire as positioned in FIGURE 9. During this movement of the frame 140, another microswitch (not shown) will be contacted so as to cause retraction of the bead ejector mechanism when the frame 140 is positioned thereunder.

When the ejector ring 26 moves downwardly, a still further microswitch will be struck to actuate cylinder 147 in the reverse direction and cause withdrawal of the tire.

It has been previously described that as the tire rolls off of the frame 140, the same will strike the arm of a microswitch 161, with this operation of the microswitch serving to energize piston 113.

It has been previously described how piston 113 serves to cause rotation of shafts 75 and 76 in opposite directions and, accordingly, it is to be understood that each of the shafts has a collar arm (not shown) provided therein in adjacency with opposed microswitches (not shown) and provided on the gear housing 74, and in this manner, when shaft 75, for example, rotates approximately 180 degrees, one such microswitch on housing 74 will be energized to, in turn, cause actuation of piston 85. A similar collar provided on shaft 71 will strike an associated microswitch that is provided on the support bearing 72, with actuation of this microswitch on bearing 72 serving to again reactuate the piston 113 in an opposite direction so as to rotate the wing members through a different path to discharge the tire on the lower mold section.

At this point and during this just described rotational movement of the shafts 75 and 76, the remaining collar provided on shaft 76 will strike the remaining microswitch to cause the piston 85 to be returned, with the result that the loading unit will be swung out from between the mold sections.

During this just described return movement of the unit 70, a still further microswitch, preferably provided on support bearing 72, will be struck, with this microswitch serving to (1) energize motor 43 to index the table and (2) restart the press operating cycle, with the press then closing and going through the curing cycle in normal fashion.

The advance of the table by motor 43 will, of course, be terminated by engagement between pin 61 and solenoid arm 60a. Upon completion of the curing cycle, the device will automatically recycle itself through the above described operations.

It will be seen from the foregoing that there has been provided a new and novel type of vulcanizing unit wherein provisions are made for effectively and automatically shaping and vulcanizing a tire without the necessity for human labor to load and unload the curing press.

While a full and complete disclosure of the invention has been made in accordance with the dictates of the patent statutes, it is to be understood that the invention is not intended to be so limited. Accordingly, where appropriate modifications of the invention may be resorted to without departing from the spirit hereof or the scope of the appended claims.

What I claim is:
1. In combination,
   a bottom mold part of a vulcanizing press,
   a tire-ejecting mechanism which comprises a support for a tire adjacent at least one of the tire beads, and reciprocable means located at least partially below a tire positioned by the support while in said bottom mold part for moving the tire upwardly out of the center of the mold part, and
   an unloading device with means providing a tire-receiving surface for support of a tire in three widely spaced areas which means is movable forward from one side of the mold part to a sufficiently advanced position over the mold part to form a complete support for the tire if projected directly downwardly thereon and which tire-receiving surface when in said advanced position extends continuously to a position away from above the mold part to transfer a tire thereon away from the mold part, said surface defining an opening large enough for downward movement of said tire support therethrough, which opening extends to the forward edge of said surface and is large enough at said edge to accommodate that portion of the reciprocable means located there when the unloading device is in operation.

2. The combination of claim 1 in which said surface of said movable means of the unloading device is provided with roller means to facilitate the movement of tires thereover, and means is provided for tilting said movable means of the unloading device so that a tire thereon will move over the rollers away from said mold part.

3. The combination of claim 1 in which said tire-receiving surface is U-shaped.

4. The combination of claim 2 in which
said means for tilting the movable means of the unloading device includes a cam attached to said tire-receiving surface to the rear of said opening therein, which cam effects lifting of the end of the tire-receiving surface which is nearest the mold part.

5. The combination of claim 1 in which
the motivating force for movement of said movable means of the unloading device to and from a position over the mold part is a pressure cylinder.

6. The combination of claim 1 in which the
movable means of the unloading device is cantileverly supported at the end farthest from the tire press.

7. The combination of claim 1 in which the top of the tire-ejecting mechanism is reciprocable in and out of the lower mold part.

8. The combination of claim 1 in which means is provided for maintaining the tire-receiving surface in a plane parallel to the tire mold during a part of its movement from one side of the mold to a position over said mold part.

9. In a device for unloading a tire from a tire mold part, a conveyor with one end directed toward and above said mold part with means for tilting the same to facilitate removal of a tire from the vicinity of the mold part,
a support for the tire in the path of the conveyor,
said end of the conveyor comprising two spaced arms in substantially the same plane located longitudinally of the conveyor to straddle said support, said conveyor being of such length that when said end is over the mold part in a position to support a tire concentric with the mold part, it extends away from the mold part to transfer a tire from such concentric position to a position laterally away from the mold part.

10. In combination with
(a) a tire press having
(1) upper and lower complemental mold parts movable between open and closed positions,
(2) tire ejecting mechanism movable axially within said lower mold part between raised and lowered positions when the mold parts are in open position, said mechanism being adapted to support a tire centrally whereby a tire supported thereon extends outwardly beyond the same, and
(b) an unloading device which comprises
(1) a conveyor large enough to support a tire thereon with means for moving the same in a substantially horizontal plane radially of the center of the lower mold part, and
(2) a tire support at the inner end of the conveyor to support three adjacent quadrants of a tire and means for positioning the same under said outwardly extending portion of a tire supported on the tire-ejecting mechanism when in the raised position.

11. Apparatus for removing cured tires from a press for shaping and curing tires, and cam means associated with said apparatus for tilting the forward end of said apparatus up, said press having a lower mold section and a tire forming mechanism on a downwardly extending support with means to elevate the cured tire above the lower mold section, said apparatus being large enough to support a tire thereon and being mounted on said press with means for moving the same under control of said cam means to the underside of a cured tire and to an inclined position to tilt the tire for discharge of the tire from said press, said apparatus comprising a second support which is attached to said press adjacent the lower mold section, a drive shaft extending transversely of said second support, power means on said second support to rotate said shaft, arm means attached to said second support, a U-shaped conveyor carried by said arm means, the area of said U being large enough to accommodate the first support, said cam means being on said conveyor, and cam follower means between said second support and said conveyor, said cam means being engaged by said follower means during rotation of said shaft.

12. The combination of a tire press with a front for loading green tires and a rear for unloading cured tires,
a conveyor attached radially to the rear of the press substantially to move cured tires substantially horizontally away from the press, the conveyor being large enough to support a tire thereon, and a bead ring with means for moving the same relative to the conveyor, to a position above the conveyor, the conveyor having an opening therein in the edge toward the press large enough to accommodate that portion of the bead ring which would prevent such relative vertical movement, and means for tilting the conveyor to facilitate movement of tires thereon away from the press.

13. The combination of claim 12 in which the means for tilting the conveyor includes a pinion and a pressure cylinder having a piston a part of which is a rack positioned in cooperative contact with the pinion.

References Cited by the Examiner
UNITED STATES PATENTS

| | | | |
|---|---|---|---|
| 1,046,386 | 12/1912 | Heimer | 198—157 |
| 1,794,331 | 2/1931 | Klyver et al. | 198—157 |
| 2,257,732 | 10/1941 | Clark | 18—16 |
| 2,307,717 | 1/1943 | Woodbury | 214—131 |
| 2,361,222 | 10/1944 | McBride. | |
| 2,371,195 | 3/1945 | Strauss | 18—16 |
| 2,567,819 | 9/1951 | Matteson et al. | 214—130 X |
| 2,710,103 | 6/1955 | Castello et al. | 214—1 |
| 2,730,763 | 1/1956 | Brundage | 18—17 |
| 2,743,478 | 5/1956 | Harlow et al. | 18—17 X |
| 2,832,992 | 5/1958 | Soderquist | 18—2 |
| 2,978,741 | 4/1961 | Soderquist | 18—2 |
| 3,008,180 | 11/1961 | Woodhall | 18—2 |
| 3,012,279 | 12/1961 | Boysen | 18—17 |
| 3,065,503 | 11/1962 | Mallory et al. | 18—17 |
| 3,141,191 | 7/1964 | Soderquist | 18—2 |
| 3,153,263 | 10/1964 | Mallory et al. | 18—17 |

J. SPENCER OVERHOLSER, *Primary Examiner.*

WILLIAM J. STEPHENSON, *Examiner.*